US010072824B1

(12) United States Patent
Xiong

(10) Patent No.: US 10,072,824 B1
(45) Date of Patent: Sep. 11, 2018

(54) ROTARY PROJECTION LAMP

(71) Applicant: ZHONGSHAN DAQI ELECTRONICS CO., LTD., Guangdong (CN)

(72) Inventor: Li Gao Xiong, Guangdong (CN)

(*) Notice: Subject to any disclaimer, the term of this patent is extended or adjusted under 35 U.S.C. 154(b) by 0 days.

(21) Appl. No.: 15/649,657

(22) Filed: Jul. 14, 2017

(51) Int. Cl.
*G03B 15/06* (2006.01)
*F21V 14/08* (2006.01)
*F21V 3/00* (2015.01)
*F21Y 115/10* (2016.01)

(52) U.S. Cl.
CPC ................ *F21V 14/08* (2013.01); *F21V 3/00* (2013.01); *F21Y 2115/10* (2016.08)

(58) Field of Classification Search
CPC ......... F21V 14/08; F21V 3/00; F21Y 2115/10
USPC ........................................ 362/283, 363, 277
See application file for complete search history.

(56) References Cited

U.S. PATENT DOCUMENTS 9,068,726 B2* 6/2015 Zhang ..................... F21V 14/06
2002/0089856 A1* 7/2002 Vogel .................... F21S 10/007
362/363
2015/0131288 A1* 5/2015 Zhang ..................... F21V 14/06
362/277

* cited by examiner

*Primary Examiner* — Karl D Frech
(74) *Attorney, Agent, or Firm* — Prakash Nama; Global IP Services, PLLC

(57) ABSTRACT

Disclosed is a rotary projection lamp which comprises a body, a surface cover, a fixed base, a rotating mechanism, a light source mechanism and light hoods, wherein the surface cover is arranged on one side of the body, the fixed base is connected with the light source mechanism, the rotating mechanism is arranged in the fixed base, the rotating end of the rotating mechanism is connected with the fixed base and the light source mechanism in a penetrating mode to achieve rotation, and the light hoods are connected with the fixed base and correspond to the rotating end in position. The rotary projection lamp has the beneficial effects of being simple in structure and convenient to use and can be used in a dual rotation or triangular rotation mode so as to meet different actual requirements.

7 Claims, 2 Drawing Sheets

ROTARY PROJECTION LAMP

BACKGROUND OF THE INVENTION

The utility model belongs to the technical field of lamps, and particularly relates to a rotary projection lamp.

Floor lamps are also called buried lamps or underground lamps and are illumination facilities which are inlaid in the ground and used for outdoor illumination and atmosphere creation.

The floor lamps are used for illumination of the ground, vegetation on the ground and the like, landscape can be made more beautiful, and pedestrians can pass more safely. Existing floor lamp products are simplex in function, are only used for illumination generally, do not have decorating and rendering functions, and cannot meet diversified requirements.

BRIEF SUMMARY OF THE INVENTION

For overcoming the defects of the prior art, the utility model aims to provide a rotary projection lamp. According to the rotary projection lamp, rotation is achieved through rotating motors, corrugated transparent light disks mounted on rotating shafts of the motors are made to rotate, LED lamp beads generate light in different shapes through the light disks, and then the light penetrates through the light disks to be refracted or focused for the second time, so that different type of scene light (dynamic) is generated.

The technical scheme adopted by the utility model for achieving the above purpose is as follows:

A rotary projection lamp comprises a body and a surface cover arranged on one side of the body and further comprises a fixed base, a rotating mechanism, a light source mechanism and light hoods, wherein the fixed base is connected with the light source mechanism, the rotating mechanism is arranged in the fixed base, the rotating end of the rotating mechanism is connected with the fixed base and the light source mechanism in a penetrating mode to achieve rotation, and the light hoods are connected with the fixed base and correspond to the rotating end in position.

What needs to be illustrated is that the rotating mechanism is composed of two rotating motors and two light disks, wherein the rotating motors are arranged in the fixed base, and one end of the rotating shaft of each one of the rotating motors is connected with the fixed base and the light source mechanism in a penetrating mode; each one of the light disks is connected with one end of each one of the rotating shafts; the number of the light hoods is matched with the number of the light disks.

What needs to be further illustrated is that the light hoods and the light disks are located on the same axis.

What needs to be further illustrated is that the light source mechanism is composed of an aluminum substrate and LED lamp beads, and the LED lamp beads correspond to the light disks in position.

What needs to be further illustrated is that the two rotating motors are arranged horizontally and adjacently.

According to another embodiment of the utility model:

A rotary projection lamp comprises a body and a surface cover arranged on one side of the body and further comprises a fixed base, a rotating mechanism, a light source mechanism and light hoods, wherein the fixed base is connected with the light source mechanism, the rotating mechanism is arranged in the fixed base, the rotating end of the rotating mechanism is connected with the fixed base and the light source mechanism in a penetrating mode to achieve rotation, and the light hoods are connected with the fixed base and correspond to the rotating end in position.

What needs to be illustrated is that the rotating mechanism is composed of three rotating motors and three light disks, wherein the rotating motors are arranged in the fixed base, and one end of the rotating shaft of each one of the rotating motors is connected with the fixed base and the light source mechanism in a penetrating mode; each one of the light disks is connected with one end of each one of the rotating shafts and located in the light hood.

What needs to be further illustrated is that the three rotating motors are arranged in a triangular mode.

What needs to be illustrated is that the light source mechanism is composed of an aluminum substrate and LED lamp beads, and the LED lamp beads are arranged in the middle of the aluminum substrate.

The rotary projection lamp of the utility model has the beneficial effects of being simple in structure and convenient to use and can be in a dual rotation or triangular rotation mode so as to meet different actual requirements.

DETAILED DESCRIPTION OF THE INVENTION

A further description of the utility model is given with accompanying drawings as follows, what needs to be pointed out is that detailed embodiments and specific operation processes are given on the premise of the technical scheme, however, the protection scope of the utility model is not limited to the embodiments.

Figure 1:
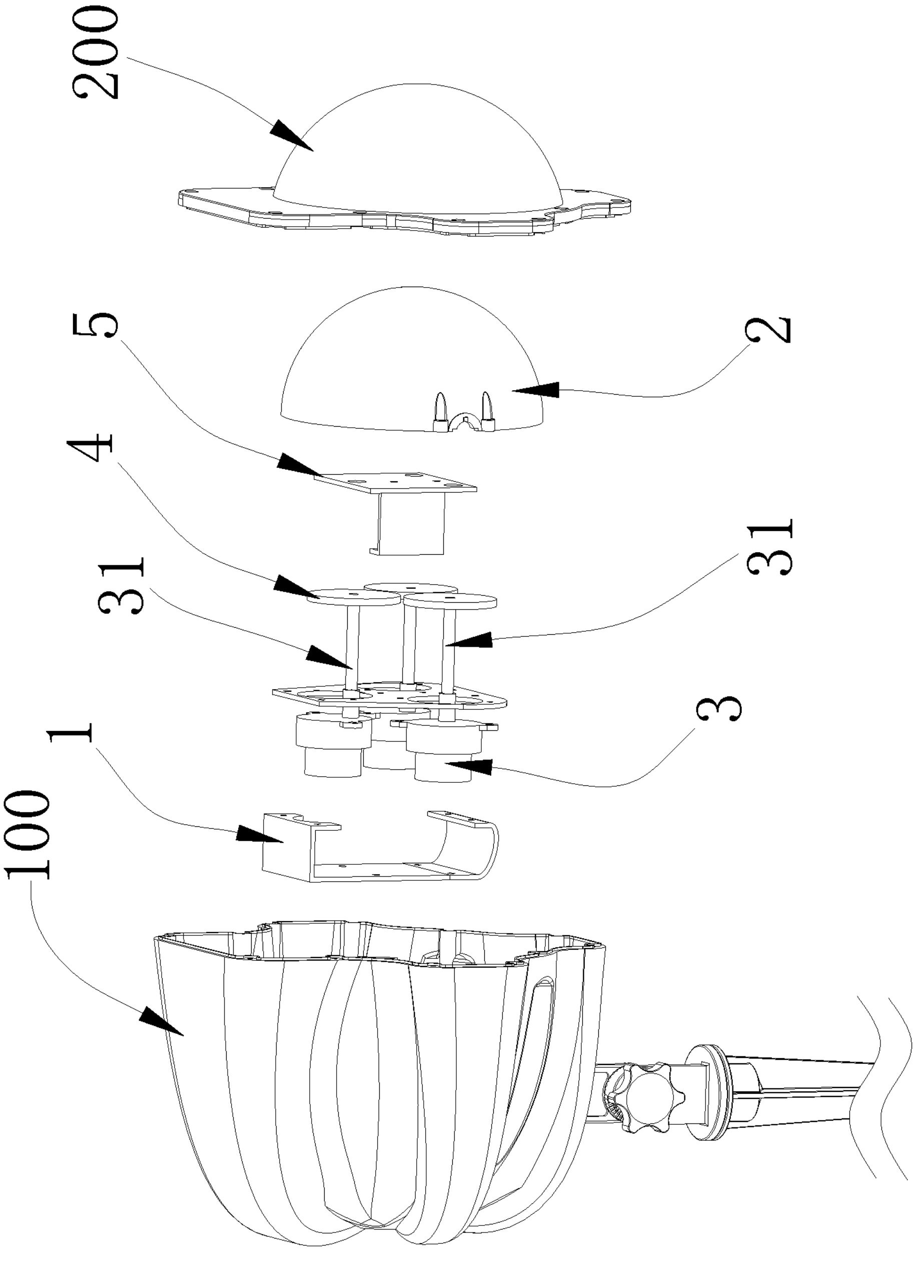
FIG. 1 is a structural schematic diagram of the utility model.

As is shown in FIG. 1, a rotary projection lamp of the utility model comprises a body 100 and a surface cover 200 arranged on one side of the body 100 and further comprises a fixed base 1, a rotating mechanism, a light source mechanism and light hoods, wherein the fixed base 1 is connected with the light source mechanism 5, the rotating mechanism is arranged in the fixed base 1, the rotating end of the rotating mechanism is connected with the fixed base 1 and the light source mechanism 5 to achieve rotation, and the light hoods 2 are connected with the fixed base 1 and correspond to the rotating end in position.

As is shown in FIG. 1, the rotating mechanism is composed of three rotating motors 3 and three light disks 4, wherein the rotating motors 3 are mounted in the fixed base 1, and one end of the rotating shaft 31 of each one of the rotating motors 3 is connected with the fixed base 1 and the light source mechanism 5 in a penetrating mode; each one of the light disks 4 is connected with one end of each one of the rotating shafts 31 and located in the light hood 2.

According to a preferred technical scheme, as is shown in FIG. 1, the three rotating motors 3 are arranged in a triangular mode.

What needs to be further illustrated is that the light source mechanism is composed of an aluminum substrate and LED lamp beads, and the LED lamp beads are arranged in the middle of the aluminum substrate.

What needs to be further illustrated is that through holes are formed in the aluminum substrate, the number of the through holes corresponds to the number of the rotating shafts, and thus the rotating shafts can rotate without being affected by the aluminum substrate.

Figure 2:
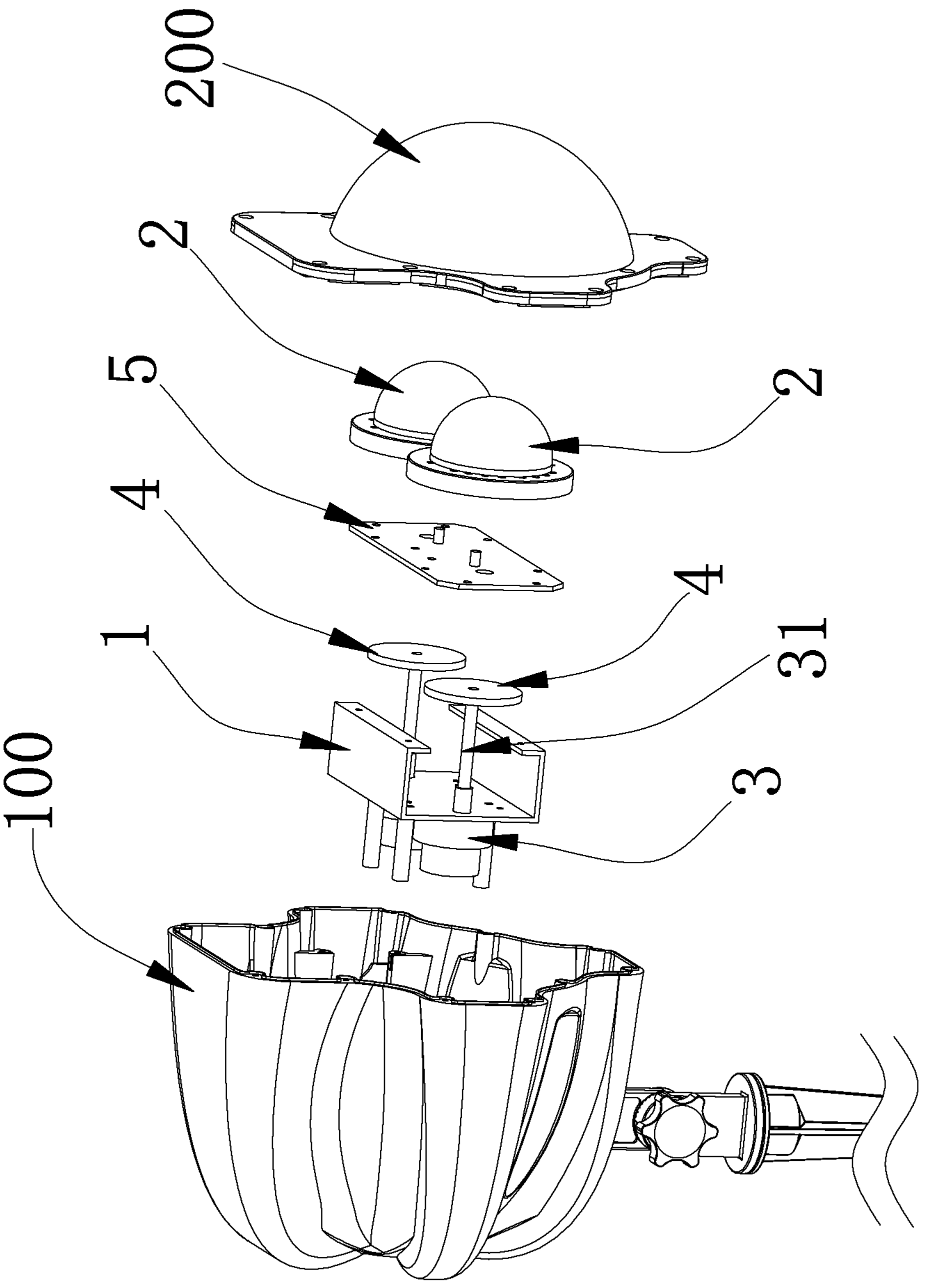
FIG. 2 is another structural schematic diagram of the utility model.

FIG. 2 shows another embodiment of the utility model:

A rotary projection lamp of the utility model comprises a body 100 and a surface cover 200 arranged on one side of the body 100 and further comprises a fixed base 1, a rotating mechanism, a light source mechanism 5 and light hoods 2, wherein the fixed base 1 is connected with the light source mechanism 5, the rotating mechanism is arranged in the fixed base 1, the rotating end of the rotating mechanism is connected with the fixed base 1 and the light source mechanism 5 in a penetrating mode to achieve rotation, and the light hoods 2 are connected with the fixed base 1 and correspond to the rotating end in position.

Furthermore, as is shown in FIG. 2, the rotating mechanism 2 is composed of two rotating motors 3 and two light disks 4, wherein the rotating motors 3 are arranged in the fixed base 1, and one end of the rotating shaft 31 of each one of the rotating motors 3 is connected with the fixed base 1 and the light source mechanism 5 in a penetrating mode; each one of the light disks 4 is connected with one end of each one of the rotating shafts 31; the number of the light hoods 2 is matched with the number of the light disks 4.

Furthermore, as is shown in FIG. 2, the light hoods 2 and the light disks 4 are located on the same axis.

What needs to be further illustrated is that the light source mechanism is composed of an aluminum substrate and LED lamp beads, and the LED lamp beads correspond to the light disks in position.

What needs to be further illustrated is that the two rotating motors are arranged horizontally and adjacently.

What needs to be further illustrated is that through holes are formed in the aluminum plate, the number of the through holes corresponds to the number of the rotating shafts, and the rotating shafts can rotate without being affected by the aluminum substrate.

EMBODIMENT

According to the rotary projection lamp of the utility model, rotation is achieved through the rotating motors, after the motors rotate, the corrugated transparent light disks start to rotate under the driving of the rotating shafts of the motors, the LED lamp beads generate light in different shapes through the corrugated transparent light disks, and then the light penetrates through the corrugated transparent light disks to be refracted or focused for the second time, so that different type of scene light (dynamic) is generated.

For those skilled in the field, other various corresponding changes and transformations can be made according to the described technical schemes and concepts, and all the changes and transformations should be within the protection scope of the claims of the utility model.

What is claimed is:

1. A rotary projection lamp, comprising a body and a surface cover arranged on one side of the body, characterized by further comprising a fixed base, a rotating mechanism, a light source mechanism and light hoods, wherein the fixed base is connected with the light source mechanism, the rotating mechanism is arranged in the fixed base, the rotating end of the rotating mechanism is connected with the fixed base and the light source mechanism in a penetrating mode to achieve rotation, and the light hoods are connected with the fixed base and correspond to the rotating end in position; the rotating mechanism is composed of three rotating motors and three light disks, the rotating motors are arranged in the fixed base, and one end of the rotating shaft of each one of the rotating motors is connected with the fixed base and the light source mechanism in a penetrating mode; each one of the light disks is connected with one end of each one of the rotating shafts and located in the light hood.

2. The rotary projection lamp according to claim 1, characterized in that the three rotating motors are arranged in a triangular mode.

3. The rotary projection lamp according to claim 1, characterized in that the light source mechanism is composed of an aluminum substrate and LED lamp beads, and the LED lamp beads are arranged in the middle of the aluminum substrate.

4. A rotary projection lamp, comprising a body and a surface cover arranged on one side of the body, characterized by further comprising a fixed base, a rotating mechanism, a light source mechanism and light hoods, wherein the fixed base is connected with the light source mechanism, the rotating mechanism is arranged in the fixed base, the rotating end of the rotating mechanism is connected with the fixed base and the light source mechanism in a penetrating mode to achieve rotation, and the light hoods are connected with the fixed base and correspond to the rotating end in position; the rotating mechanism is composed of two rotating motors and two light disks, the rotating motors are arranged in the fixed base, and one end of the rotating shaft of each one of the rotating motors is connected with the fixed base and the light source mechanism in a penetrating mode; each one of the light disks is connected with one end of each one of the rotating shafts; the number of the light hoods is matched with the number of the light disks.

5. The rotary projection lamp according to claim 4, characterized in that the light hoods and the light disks are located on the same axis.

6. The rotary projection lamp according to claim 4, characterized in that the light source mechanism is composed of an aluminum substrate and LED lamp beads, and the LED lamp beads correspond to the light disks in position.

7. The rotary projection lamp according to claim 4, characterized in that the two rotating motors are arranged horizontally and adjacently.

* * * * *